US011952996B2

(12) United States Patent
Oehring et al.

(10) Patent No.: US 11,952,996 B2
(45) Date of Patent: *Apr. 9, 2024

(54) CONSTANT VOLTAGE POWER DISTRIBUTION SYSTEM FOR USE WITH AN ELECTRIC HYDRAULIC FRACTURING SYSTEM

(71) Applicant: U.S. Well Services, LLC, Houston, TX (US)

(72) Inventors: Jared Oehring, Houston, TX (US); Brandon N. Hinderliter, Houston, TX (US)

(73) Assignee: U.S. Well Services, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/157,458

(22) Filed: Jan. 25, 2021

(65) Prior Publication Data

US 2021/0140423 A1    May 13, 2021

Related U.S. Application Data

(62) Division of application No. 15/829,419, filed on Dec. 1, 2017, now Pat. No. 11,181,107.

(Continued)

(51) Int. Cl.
F04B 49/06 (2006.01)
E21B 43/26 (2006.01)
(Continued)

(52) U.S. Cl.
CPC .......... *F04B 49/06* (2013.01); *E21B 43/2607* (2020.05); *F01D 15/08* (2013.01);
(Continued)

(58) Field of Classification Search
CPC ........ F04B 49/06; H02P 29/032; H02P 27/04; F01D 15/08; F01D 15/10; H02J 3/38; H02J 11/00; H02K 7/1823; E21B 43/26
(Continued)

(56) References Cited

U.S. PATENT DOCUMENTS 2,976,025 A    3/1961  Pro
3,878,884 A    4/1975  Raleigh
(Continued)

FOREIGN PATENT DOCUMENTS

CN    104117308 A    10/2014
CN    104196613 A    12/2014
(Continued)

OTHER PUBLICATIONS

Non-Final Office Action issued in U.S. Appl. No. 16/871,928 dated Aug. 25, 2021.

(Continued)

*Primary Examiner* — Alfonso Perez Borroto
(74) *Attorney, Agent, or Firm* — Hogan Lovells US LLP (57) ABSTRACT

A hydraulic fracturing system includes a turbine generator for producing electricity at a well site, the turbine generator producing electrical energy at a voltage. The system also includes an electric pump electrically coupled to the turbine generator and receiving operative power from the turbine generator. The system further includes switch gear arranged between the electric pump and the turbine generator, the switch gear distributing electrical energy from the turbine generator to the electric pump, wherein the voltage remains substantially constant from the turbine generator to the electric pump.

20 Claims, 8 Drawing Sheets

Related U.S. Application Data (60) Provisional application No. 62/429,499, filed on Dec. 2, 2016.

(51) Int. Cl.

| | | |
|---|---|---|
| *F01D 15/08* | (2006.01) | |
| *F01D 15/10* | (2006.01) | |
| *F04B 15/02* | (2006.01) | |
| *F04B 17/03* | (2006.01) | |
| *F04B 23/00* | (2006.01) | |
| *H02J 3/38* | (2006.01) | |
| *H02K 7/18* | (2006.01) | |
| *H02P 27/04* | (2016.01) | |
| *H02P 29/032* | (2016.01) | |
| *F04B 49/20* | (2006.01) | |
| *H02J 11/00* | (2006.01) | |

(52) U.S. Cl.
CPC .............. *F01D 15/10* (2013.01); *F04B 15/02* (2013.01); *F04B 17/03* (2013.01); *F04B 23/00* (2013.01); *H02J 3/38* (2013.01); *H02K 7/1823* (2013.01); *H02P 27/04* (2013.01); *H02P 29/032* (2016.02); *E21B 43/26* (2013.01); *F04B 49/20* (2013.01); *H02J 3/381* (2013.01); *H02J 11/00* (2013.01)

(58) Field of Classification Search
USPC .......................................................... 307/17
See application file for complete search history.

(56) References Cited

U.S. PATENT DOCUMENTS

| | | | |
|---|---|---|---|
| 4,411,313 A | 10/1983 | Johnson et al. | |
| 4,538,916 A | 9/1985 | Zimmerman | |
| 4,601,629 A | 7/1986 | Zimmerman | |
| 4,768,884 A | 9/1988 | Elkin | |
| 5,114,239 A | 5/1992 | Allen | |
| 5,334,899 A | 8/1994 | Skybyk | |
| 5,436,555 A * | 7/1995 | Locke ................... | G01R 31/60 379/22.03 |
| 5,439,066 A | 8/1995 | Gipson | |
| 5,486,047 A | 1/1996 | Zimmerman | |
| 5,798,596 A | 8/1998 | Lordo | |
| 5,813,455 A | 9/1998 | Pratt et al. | |
| 5,950,726 A | 9/1999 | Roberts | |
| 6,035,265 A | 3/2000 | Dister et al. | |
| 6,097,310 A | 8/2000 | Harrell et al. | |
| 6,121,705 A | 9/2000 | Hoong | |
| 6,273,193 B1 | 8/2001 | Hermann et al. | |
| 6,442,942 B1 | 9/2002 | Kopko | |
| 6,585,455 B1 | 7/2003 | Petersen et al. | |
| 6,788,022 B2 | 9/2004 | Sopko | |
| 6,985,750 B1 | 1/2006 | Vicknair et al. | |
| 7,795,830 B2 | 9/2010 | Johnson | |
| 9,062,545 B2 | 6/2015 | Roberts et al. | |
| 9,140,105 B2 | 9/2015 | Pattillo | |
| 9,353,593 B1 | 5/2016 | Lu et al. | |
| 9,506,333 B2 | 11/2016 | Castillo et al. | |
| 9,790,858 B2 | 10/2017 | Kanebako | |
| 9,945,365 B2 | 4/2018 | Hernandez et al. | |
| 10,221,639 B2 | 3/2019 | Romer et al. | |
| 10,408,030 B2 | 9/2019 | Oehring et al. | |
| 10,408,031 B2 | 9/2019 | Oehring et al. | |
| 10,415,332 B2 | 9/2019 | Morris et al. | |
| 10,648,270 B2 | 5/2020 | Brunty et al. | |
| 10,648,311 B2 | 5/2020 | Oehring et al. | |
| 10,686,301 B2 | 6/2020 | Oehring et al. | |
| 10,731,561 B2 | 8/2020 | Oehring et al. | |
| 10,740,730 B2 | 8/2020 | Altamirano et al. | |
| 10,767,561 B2 | 9/2020 | Brady | |
| 10,781,752 B2 | 9/2020 | Kikkawa et al. | |
| 10,794,165 B2 | 10/2020 | Fischer et al. | |
| 10,988,998 B2 | 4/2021 | Fischer et al. | |
| 2001/0000996 A1 | 5/2001 | Grimland et al. | |
| 2004/0045703 A1 | 3/2004 | Hooper et al. | |
| 2005/0201197 A1 | 9/2005 | Duell et al. | |
| 2006/0109141 A1 | 5/2006 | Huang | |
| 2008/0164023 A1 | 7/2008 | Dykstra et al. | |
| 2008/0257449 A1 | 10/2008 | Weinstein et al. | |
| 2008/0277120 A1 | 11/2008 | Hickie | |
| 2009/0072645 A1 | 3/2009 | Quere | |
| 2011/0081268 A1 | 4/2011 | Ochoa et al. | |
| 2011/0110793 A1 | 5/2011 | Leugemores et al. | |
| 2012/0063936 A1 | 3/2012 | Baxter et al. | |
| 2012/0112757 A1 | 5/2012 | Vrankovic et al. | |
| 2012/0150455 A1 | 6/2012 | Franklin et al. | |
| 2013/0051971 A1 | 2/2013 | Wyse et al. | |
| 2013/0284455 A1 | 10/2013 | Kajaria et al. | |
| 2013/0306322 A1 * | 11/2013 | Sanborn ............. | E21B 43/2607 166/308.1 |
| 2014/0010671 A1 * | 1/2014 | Cryer ...................... | E21B 43/26 290/45 |
| 2014/0174717 A1 * | 6/2014 | Broussard ........... | E21B 43/2607 166/66.4 |
| 2014/0271114 A1 * | 9/2014 | Phillips ................... | F01D 21/00 415/118 |
| 2015/0027712 A1 * | 1/2015 | Vicknair ................. | E21B 41/00 166/305.1 |
| 2015/0147194 A1 | 5/2015 | Foote | |
| 2015/0233530 A1 | 8/2015 | Sandidge | |
| 2016/0006311 A1 | 1/2016 | Li | |
| 2016/0032703 A1 * | 2/2016 | Broussard ........... | E21B 43/2607 166/250.01 |
| 2016/0194942 A1 * | 7/2016 | Wiegman ................ | F04B 17/03 166/250.15 |
| 2016/0195082 A1 * | 7/2016 | Wiegman ................ | F04B 23/04 417/63 |
| 2016/0230525 A1 * | 8/2016 | Lestz .................. | E21B 43/2607 |
| 2016/0230660 A1 | 8/2016 | Zeitoun et al. | |
| 2016/0258267 A1 * | 9/2016 | Payne ..................... | E21B 43/26 |
| 2016/0273328 A1 * | 9/2016 | Oehring ................. | F04B 47/06 |
| 2016/0281484 A1 * | 9/2016 | Lestz ........................ | C09K 8/82 |
| 2016/0319649 A1 * | 11/2016 | Oehring ............... | E21B 43/267 |
| 2016/0326853 A1 | 11/2016 | Fred et al. | |
| 2016/0348479 A1 * | 12/2016 | Oehring ................. | F04B 49/20 |
| 2016/0369609 A1 * | 12/2016 | Morris .................... | E21B 43/26 |
| 2017/0051732 A1 * | 2/2017 | Hemandez ............. | F04B 17/06 |
| 2017/0082033 A1 | 3/2017 | Wu et al. | |
| 2017/0096889 A1 | 4/2017 | Blanckaert et al. | |
| 2017/0204852 A1 | 7/2017 | Barnett | |
| 2017/0212535 A1 | 7/2017 | Shelman et al. | |
| 2017/0370639 A1 | 12/2017 | Barden et al. | |
| 2018/0090914 A1 | 3/2018 | Johnson et al. | |
| 2018/0181830 A1 | 6/2018 | Luharuka et al. | |
| 2018/0259080 A1 | 9/2018 | Dale et al. | |
| 2018/0266217 A1 | 9/2018 | Funkhauser et al. | |
| 2018/0284817 A1 | 10/2018 | Cook et al. | |
| 2018/0298731 A1 | 10/2018 | Bishop | |
| 2018/0312738 A1 | 11/2018 | Rutsch et al. | |
| 2018/0313677 A1 | 11/2018 | Warren et al. | |
| 2018/0363640 A1 | 12/2018 | Kajita et al. | |
| 2018/0366950 A1 | 12/2018 | Pedersen et al. | |
| 2019/0040727 A1 | 2/2019 | Oehring et al. | |
| 2019/0128104 A1 | 5/2019 | Graham et al. | |
| 2019/0145251 A1 | 5/2019 | Johnson | |
| 2019/0154020 A1 | 5/2019 | Glass | |
| 2019/0211661 A1 * | 7/2019 | Reckels ................... | F02C 6/00 |
| 2019/0249527 A1 | 8/2019 | Kraynek | |
| 2019/0257462 A1 | 8/2019 | Rogers | |
| 2020/0040878 A1 | 2/2020 | Morris | |
| 2020/0325760 A1 | 10/2020 | Markham | |
| 2020/0350790 A1 | 11/2020 | Luft et al. | |

FOREIGN PATENT DOCUMENTS

| | | |
|---|---|---|
| CN | 112196508 A | 1/2021 |
| WO | 2009046280 | 4/2009 |
| WO | 2014177346 | 11/2014 |

(56) References Cited

FOREIGN PATENT DOCUMENTS

| WO | 2018044307 A1 | 3/2018 |
|---|---|---|
| WO | 2018213925 A1 | 11/2018 |
| WO | 2019210417 | 11/2019 |

OTHER PUBLICATIONS

Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.

* cited by examiner

CONSTANT VOLTAGE POWER DISTRIBUTION SYSTEM FOR USE WITH AN ELECTRIC HYDRAULIC FRACTURING SYSTEM

CROSS REFERENCE TO RELATED APPLICATIONS

This application is a divisional of U.S. patent application Ser. No. 15/829,419, filed Dec. 1, 2017, and claims priority to and the benefit of U.S. Provisional Application Ser. No. 62/429,499, filed Dec. 2, 2016, the full disclosures of which are hereby incorporated by reference herein for all purposes.

BACKGROUND

1. Technical Field

This disclosure relates generally to hydraulic fracturing and more particularly to systems and methods for supplying constant voltage power to hydraulic fracturing equipment.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant, chemicals, and the like into the fluid, cranes, wireline units, and many other components that all perform different functions to carry out fracturing operations.

Usually in fracturing systems, the fracturing equipment runs on diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a well site. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering mobile fracturing operations.

Utilizing electric power sources to provide power to electric pumps presents its own challenges. Large scale power systems may generate three phase alternating current (AC) electricity at 13.8 kV. Pumps and other equipment, however, may operate at lower voltages, and as a result, transformers are utilized to step down the voltage. These transformers are large, expensive, and difficult to move from well site to well site. Moreover, adding additional equipment complicates the mobilization and de-mobilization process, for example, the processes to properly configure and run the power lines between equipment. Furthermore, cable management may cause problems at the well site by taking up large areas to keep personnel away from the cables. Additionally, increasing the number of cables and electrical equipment at the well site presents potential hazards, such as equipment shortages, personnel being in high voltage areas, and the like.

SUMMARY

In an embodiment, a hydraulic fracturing system for fracturing a subterranean formation includes a turbine generator for producing electricity at a well site, the turbine generator producing electrical energy at a voltage. The system also includes an electric pump electrically coupled to the turbine generator and receiving operative power from the turbine generator. The system further includes switch gear units arranged between the electric pump and the turbine generator, the switch gear units distributing electrical energy from the turbine generator to the electric pump, wherein the voltage remains substantially constant from the turbine generator to the electric pump.

In an embodiment, a hydraulic fracturing system for fracturing a subterranean formation includes a turbine generator for producing electricity at a well site, the turbine generator producing electrical energy at a voltage. The system also includes an electric pump electrically coupled to the turbine generator and receiving operative power from the turbine generator. The system further includes switch gear units arranged between the electric pump and the turbine generator, the switch gear units distributing electrical energy from the turbine generator to the electric pump, wherein the voltage remains substantially constant from the turbine generator to the electric pump. The system also includes a variable frequency drive connected to the motor to control the speed of the motor, wherein the variable frequency drive frequently performs electric motor diagnostics to prevent damage to the motor.

Other aspects and features of the present disclosure will become apparent to those of ordinary skill in the art after reading the detailed description herein and the accompanying figures.

BRIEF DESCRIPTION OF DRAWINGS

The foregoing aspects, features, and advantage of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure describe systems and methods for power distribution for hydraulic fracturing operations. In various embodiments, equipment at the hydraulic fracturing site utilizes power at substantially the same voltage as it is produced at. In other words, power generated at the site, for example by a turbine generator, is not stepped down, for example via a transformer, before it is utilized at the equipment. For example, equipment used in hydraulic fracturing operations may be specifically designed to operate at the voltage produced by the turbine generator. Accordingly, costs associated with operations may be reduced by eliminating the transformers typically used and also by reducing complexity at the site regarding mobilization and de-mobilization. That is, by eliminating equipment there may be fewer electrical connections at the site, which simplifies installation and also reduces the likelihood of errors during installation. Furthermore, embodiments of the present disclosure include various pumping configurations. For example, one or more pumping trailers may include pumps, variable frequency drives, or combinations thereof. In certain embodiments, the pumps and variable frequency drives may be arranged on different trailers and/or skids, thereby freeing up space to include additional equipment on the dedicated skids. In this manner, the different configurations may be utilized to simplify staging at the well site.

Further described herein are systems and methods of power distribution for an electric hydraulic fracturing system, where the voltage of the electricity remains substantially constant between where the electricity is generated and where the electricity is consumed. In various embodiments, the power distribution system eliminates transformers that condition electricity used by pumps to pressurize fracturing fluid. For example, the transformers may be 3500 kVA transformers that convert three phase AC electricity at 13.8 kV to three-phase AC electricity at 600 V. Additionally, in various embodiments, the power distribution system may include one or more transformers that condition power only for particularly selected equipment. For example, the transformers may include AC-DC transformers (e.g., 5 V, 12 V, 24 V, etc.), AC-AC transformers (e.g., 120 V and 240 V), and DC-AC inverters. In various embodiments, various equipment described herein can be onboard or mounted to larger devices and certain equipment may operate at less than 5 kVA. In various embodiments, transformers used with power generation and distribution grids may not be included to thereby simplify the well site and reduce costs.

In various embodiments, an electric hydraulic fracturing system may include an auxiliary unit having a trailer on which various devices are mounted. For example, the trailer may include a variable frequency drive ("VFD") that can be used to control the blender discharge motor. Moreover, soft starters for the blender hydraulic motor, soft starters for the hydration unit hydraulic motor, soft starters for blower motors on the mixing equipment (blenders, hydration unit, and dual belt), power electronics (breakers) for the mixing equipment, cable connections for mixing equipment, lower voltage DC and AC transformers, and a large 3500 kVA transformer may further be utilized. Other embodiments may include breaking these components into several units or mounting the components on other hydraulic fracturing equipment.

Figure 1:
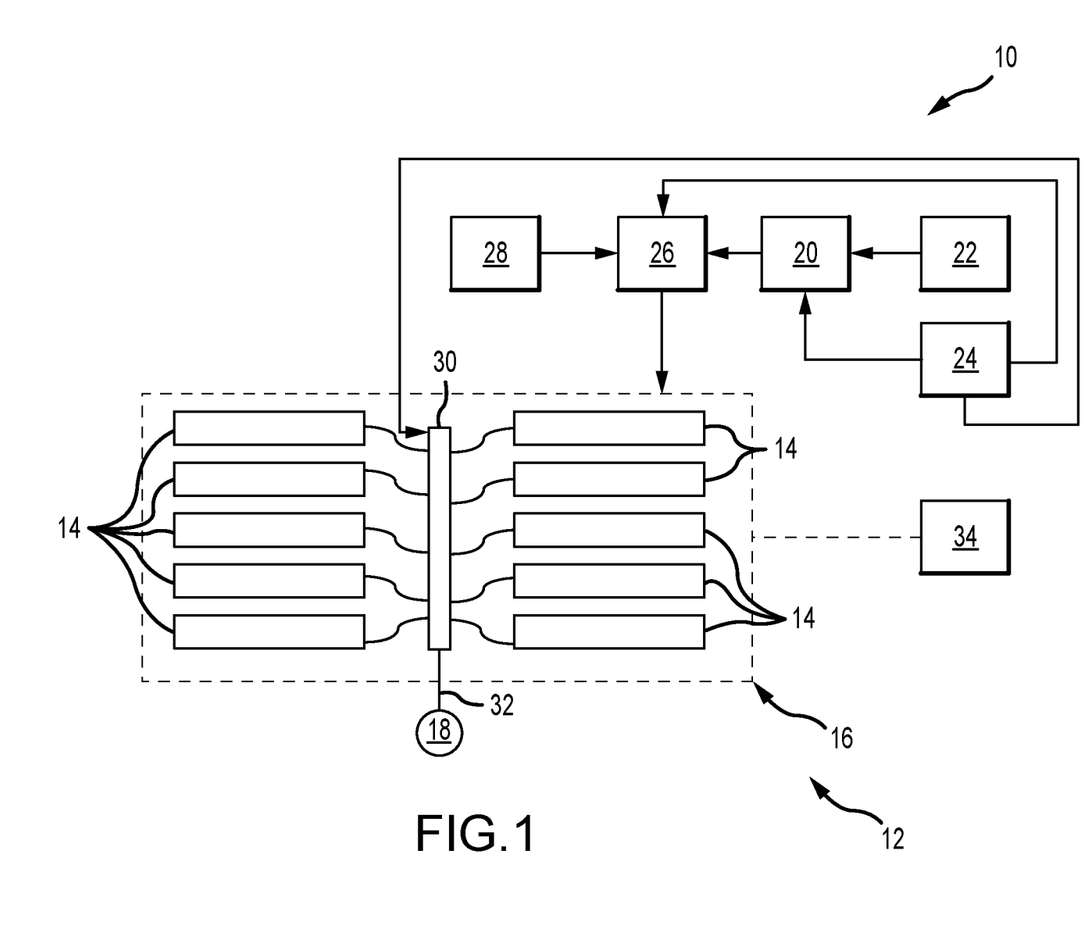
FIG. 1 is a schematic block diagram of an embodiment of a hydraulic fracturing system, in accordance with embodiments of the present disclosure.

FIG. 1 is a plan schematic view of an embodiment of a hydraulic fracturing system 10 positioned at a well site 12. In the illustrated embodiment, pump units 14, which make up a pumping system 16, are used to pressurize a slurry solution for injection into a wellhead 18. It should be appreciated that, in certain embodiments, the pump units 14 may be referred to as "pump trucks" or the like. Such recitation is not intended to limit the present disclosure. As used herein, pump units 14 refer to systems including pumps that may be skid mounted, truck mounted, trailer mounted, foundation mounted, or any other reasonable configuration to enable operation at well site. In various embodiments, a pump may be mounted on a skid that is thereafter arranged on a truck or trailer to enable transportation. In embodiments, the truck or trailer may continue to hold or otherwise support the pump during operation. Additionally, in various embodiments, the pump may be removed from the truck or trailer and staged at the well site, for example on a skid, platform, foundation, or the like. A hydration unit 20 receives fluid from a fluid source 22 via a line, such as a tubular, and also receives additives from an additive source 24. It should be appreciated that in various embodiments the additive source 24 may direct additives directly to the blender 26, directly to a missile, or a combination thereof. In an embodiment, the fluid is water and the additives are mixed together and transferred to a blender unit 26 where proppant from a proppant source 28 may be added to form the slurry solution (e.g., fracturing slurry) which is transferred to the pumping system 16 through the low pressure portion of a distribution system 30 (e.g., a manifold). It should be appreciated that the distribution system 30 may include high and low pressure sections. The low pressure sections may receive fluid, such as slurry from the blender, and then be boosted to sufficient pressure for hydraulic fracturing. The high pressure section may consolidate high pressure slurry from the pumps for injection into the well head. The pump units 14 may receive the slurry solution at a first pressure (e.g., 80 psi to 140 psi) and boost the pressure to around 15,000 psi for injection into the wellhead 18. In certain embodiments, the pump units 14 are powered by electric motors.

After being discharged from the pump system 16, the distribution system 30, such as the manifold, receives the slurry solution for injection into the wellhead 18. In various embodiments, the distribution system 30 may include a missile trailer and/or manifold pipe segments that are routed at ground level. These systems may be coupled via low pressure tubing or high pressure piping to enable a variety of configurations particularly selected for individual fracturing jobs. The distribution system 30 consolidates the slurry solution from each of the pump units 14 and includes discharge piping 32 coupled to the wellhead 18. In this manner, pressurized solution for hydraulic fracturing may be injected into the wellhead 18. In the illustrated embodiment, the system further includes a controller 34, which may be utilized to monitor and/or control various aspects of the pumping systems 16.

Figure 2:
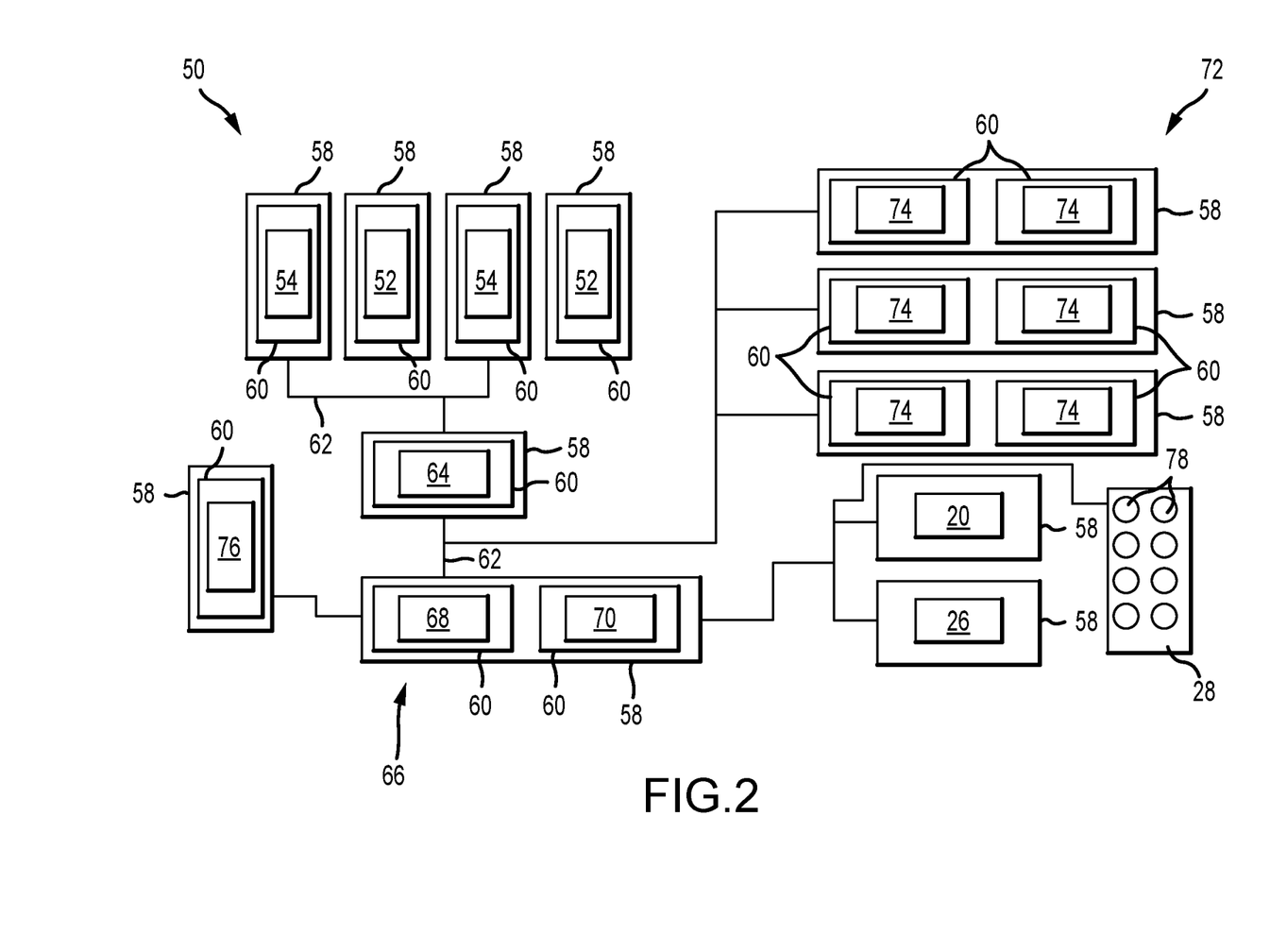
FIG. 2 is a schematic block diagram of an embodiment of a power distribution system, in accordance with embodiments of the present disclosure.

FIG. 2 is a plan schematic view of an embodiment of a power distribution system 50. In the illustrated embodiment, the power distribution system 50 provides electrical power to the hydraulic fracturing system 10, for example to power the pumping systems 16 and/or auxiliary and support equipment such as the hydration unit 20, blender unit 26, and the like. The power distribution system 50 includes a turbine generator 52 and an electronic equipment room 54 (EER). In various embodiments, the turbine generator 52 and/or the electronic equipment room 54 may be mounted on a skid 56 and/or trailer 58 for ease of movement between well sites. Moreover, in embodiments, the turbine generator 52 and associated equipment may also be truck mounted. For example, the turbine generator 52 may be mounted on the trailer 58 within a housing 60 mounted on the trailer. The generator may be natural gas powered, diesel powered, blended-fuel powered, or powered by some other reasonable energy source, and one or more generators can be provided in each housing 60 and/or be mounted on each skid 56 and/or trailer 58. In various embodiments, the EER 54 also includes an independent trailer 58 and housing 60. In the illustrated embodiment, the respective trailers are arranged generally parallel to one another. A walkway elevated from grade may be arranged between the trailers 58 for provide accessibility to the respective housings 60. In various embodiments, power and communications cables 62 can extend between associated equipment, such as switch gear units 64, and EERs 54. It should be appreciated that the cables 62 may be utilized to connect a variety of equipment at the well site and the embodiments illustrated herein have been simplified and do not necessarily illustrate each cable that may be arranged at the well site.

FIG. 2 further includes the switch gear 64. In the illustrated embodiment, the switch gear 64 uses 4160 V three phase power. In various embodiments, the switch gear 64 distributes electricity to transformers, auxiliary units and the like. Moreover, the switch gear 64 may isolate equipment from electricity. That is, the switch gear 64 may control or regulate how/when electrical energy is transmitted to other equipment. In the embodiment illustrated in FIG. 2, the electricity provided to the switch gear 64 is generated by the turbines 52. However, it should be appreciated that other power systems may be utilized to generate and provide electricity to the illustrated switch gear 64. Examples of voltages handled by the switch gear 64 include approximately 13.8 kV, or any voltage that the switch gear 64 may be designed to accommodate. In various embodiments, breakers and fault protection equipment are included in the housing 60 that covers the switch gear 64. Power cables 62 from the turbines 52 can be connected to the switch gear 64 on a side, such as a forward facing side, and an outgoing connector may direct power cables 62 toward other equipment. In various embodiments, the inlet connectors may be on a different portion of the switch gear 64, such as on an opposite site, to thereby provide a visual indicator to operators at the site working to connect and disconnect the cables 62. In the illustrated embodiment, the switch gear 64 is mounted on a trailer 58 and includes the housing 60. However, it should be appreciated that in other embodiments the switch gear 64 may be mounted on a skid 56 and/or on a truck. Accordingly, mobilization and demobilization of the switch gear 64 may be simplified because large equipment, such as cranes, may not be utilized to position the switch gear 64 at the well site 12, and rather, the trailer 58 can be positioned at the desired location.

The embodiment illustrated in FIG. 2 further includes an auxiliary unit 66, which in the illustrated embodiments is mounted on a trailer 58 and within a housing 60. For example, the illustrated auxiliary unit 66 may be a variable frequency drive (VFD) 68 and a 3500 kVA transformer 70. However, as will be described in detail below, various embodiments illustrate a constant voltage power system that eliminates large step down transformers. Various embodiments may include one or more transformers for the benefit of equipment that may not be configured to operate at the same voltage as the power generated by the turbine generators. For example, auxiliary equipment may operate at approximately 600V while the pumps are designed to operate at the same voltage generated by the turbine generators. As such, transformers may be incorporated to provide power to the associated equipment. It should be appreciated that various auxiliary trailers may be utilized to selected equipment at the well site and various configurations may be implemented to enable different designs and configurations to be utilized based on costs, space constraints, availability of equipment, and the like. These components may be mounted on a common trailer 58. In other embodiments, the components may be on separate, independent trailers 58. Moreover, it should be appreciated that the equipment may also be skid-mounted on a truck. In certain embodiments, the VFD 68 may be part of a hydraulic fracturing fleet, which includes a frac pump, the VFD, breakers, soft starts, AC or DC transformers, lights, electronics, and other associated equipment. The VFD 68 may be referred to as a VFD house and may include an independent VFD for each pump coupled to the VFD and/or VFD house 68. For simplicity, the arrangement may be referred to as the VFD 68. The hydraulic fracturing pumps may be on a single common trailer, or broken up with various associated equipment on different trailers. It should be appreciated that while the illustrated auxiliary unit 66 includes the VFD 68 and the transformer 70, that in other embodiments the VFD 68 or other equipment may be collectively, or individually, referred to as auxiliary equipment. Transformer 70 may also be omitted for embodiments utilizing constant voltage. In these embodiments, the step down transformer 70 is not needed because the hydraulic fracturing equipment, such as the pumps, operates at the same voltage generated by the turbine generators.

FIG. 2 further illustrates an electric fracturing pump system 72, which in the illustrated embodiment includes twin fracturing pumps 74. It should be appreciated that while the illustrated embodiment includes dual pumps 74, other embodiments may include one, three, four, five, or any reasonable number of fracturing pumps 74. In the illustrated embodiment, each pump 74 is capable of consuming up to 1.2 MW of electricity. Therefore, the illustrated twin fracturing pumps 74 can draw about 2.5 MW of electricity under full load conditions. In various embodiments, a single pump, motor, VFD, and support equipment may be arranged on the illustrated trailer 58. Moreover, in various embodiments, the fracturing pump system could include major components such as the VFD being separate from the trailer 58. As described above, the fracturing pumps 74 may be on the trailer 58, on the skid 56, on a truck, or any combination thereof. It should be appreciated that the pumps 74 may be configured such that a single motor is arranged to drive both pumps 74. For instance, the pumps 74 may be arranged on either side of a motor such that rotation of the motor drives both pumps 74 simultaneously.

As will be described below, in certain embodiments transformers are removed from the power distribution system 50 and power may be supplied directly from the generators 52. That is, the generation produces power at the same voltage that the pumps receive and utilize the power. However, in certain embodiments, the transformer 70 may be utilized to condition electricity. In the illustrated embodiment, the transformer 70 is separate from the VFD 68 described above, and may be used to condition power for auxiliary equipment. For example, the transformer 70 may be a 3500 kVA transformer that converts three AC 13.8 kV electricity to three phase AC 600 V electricity. Cable connections may be arranged along the transformer 70 receive power output from the generators 52, the switch gear 64, or a combination thereof. In various embodiments, the transformer 70 is mounted on the skid 56 and includes the housing 60. It should be appreciated that the transformer 70 may be mounted on the trailer 58 and/or on a truck. In various embodiments, including the smaller transformer 70 may be advantageous to supply power to secondary equipment. For example, other operators on the site may request use of the electrical power generated by the turbines 52, for example for lighting or wireline operations. By facilitating connections for operators, the well site may be more streamlined and utilize less equipment than if each different operator or vendor brought their own power supplies.

FIG. 2 includes various pieces of auxiliary and support equipment that may be utilized during hydraulic fracturing operations. This equipment may utilize power provided by the power distribution system 50. For example, the hydration unit 20, which is mounted on the trailer 58 in the illustrated embodiment, holds liquids for use with a fracturing process. In various embodiments, a manifold system on the trailer 58 provides selective communication between the container and designated destinations for the liquid in the container.

Furthermore, auxiliary equipment may include the blending unit 26, which may include an electrically powered component that receives energy from the turbine generator 52. The illustrated embodiments includes the blending unit 26 arranged on the trailer 58. In operation, proppant and liquid from the hydration unit 20 are blended together into a slurry via the blending unit 26. A manifold system may be included with the blending unit 26 for selective distribution of the slurry to designated locations.

Moreover, in the illustrated embodiment, an electric data van 76 may be arranged at the well site 12. In the illustrated embodiment, the electric data van 76 is on the trailer 58 and includes the housing 60. However, it should be appreciated that in other embodiments it may be on the skid 56 and/or on a truck. Controls for operating the electric hydraulic fracturing system may be provided in the housing 60 of the electric data van 76, as well as devices for monitoring conditions and operational parameters of components of the electric hydraulic fracturing system. Thus, operations personnel within the data van can control devices of the electric hydraulic fracturing system and monitor their operation.

FIG. 2 further illustrates the proppant source 28, which may be silos, containerized proppant solutions, or the like, to provide proppant to the blender unit 26. The illustrated embodiment includes silos 78 arranged in rows and may further include an electric sand conveyor for moving the proppant from the proppant source 28 to the blender unit 26. It should be appreciated that while silos 78 are illustrated, different proppant delivery solutions, such as containerized solutions, may also be utilized in various embodiments. Accordingly, the well site 12 may include a variety of equipment that may utilize the electrical power generated by the power distribution system 50.

Figure 3:
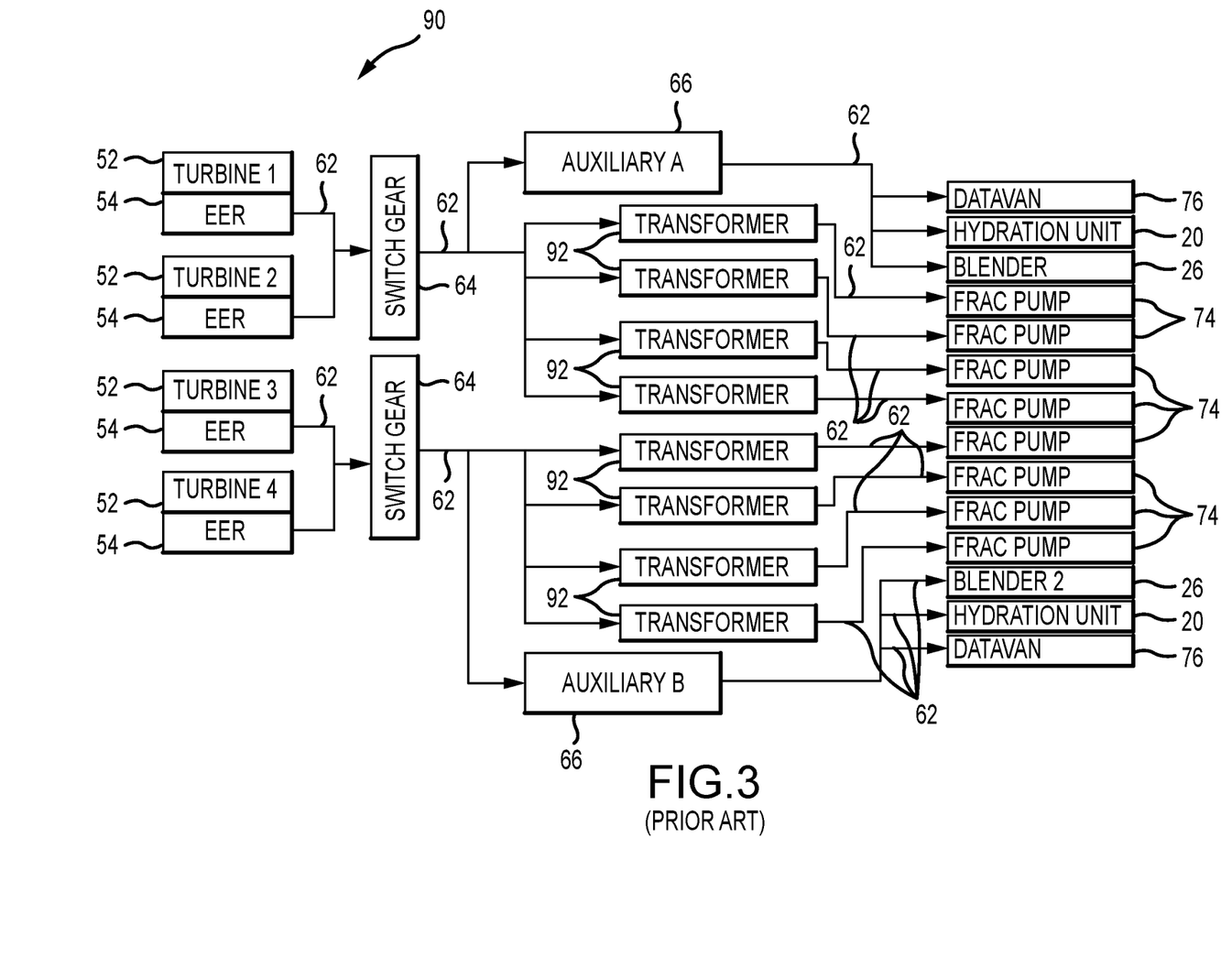
FIG. 3 is a schematic block diagram of an embodiment of a prior art power distribution system, in accordance with embodiments of the present disclosure.

FIG. 3 is a schematic plan view of an embodiment of a power distribution system 90, in which the voltage does not remain constant between the power generation and the use by the equipment. As shown, power is generated by the generators 52, for example at 13.8 kV, and transmitted to the switch gear 64 via cables 62, where it is then transmitted to the transformers 92 and auxiliary units 66. In various embodiments, the transformers 92 step the voltage down to 600 V, which is the voltage typically used for hydraulic fracturing equipment. Additionally, each auxiliary unit 66 may also include a transformer to step down the voltage for the associated equipment. As a result, the illustrated power distribution system 90 is complex, takes up large quantities of space at the well site, is expensive, and has limitations regarding power distribution over distances, for example to adjacent well sites. Systems and methods of the present disclosure overcome these deficiencies, as well as others, for improved power distribution.

Figure 4:
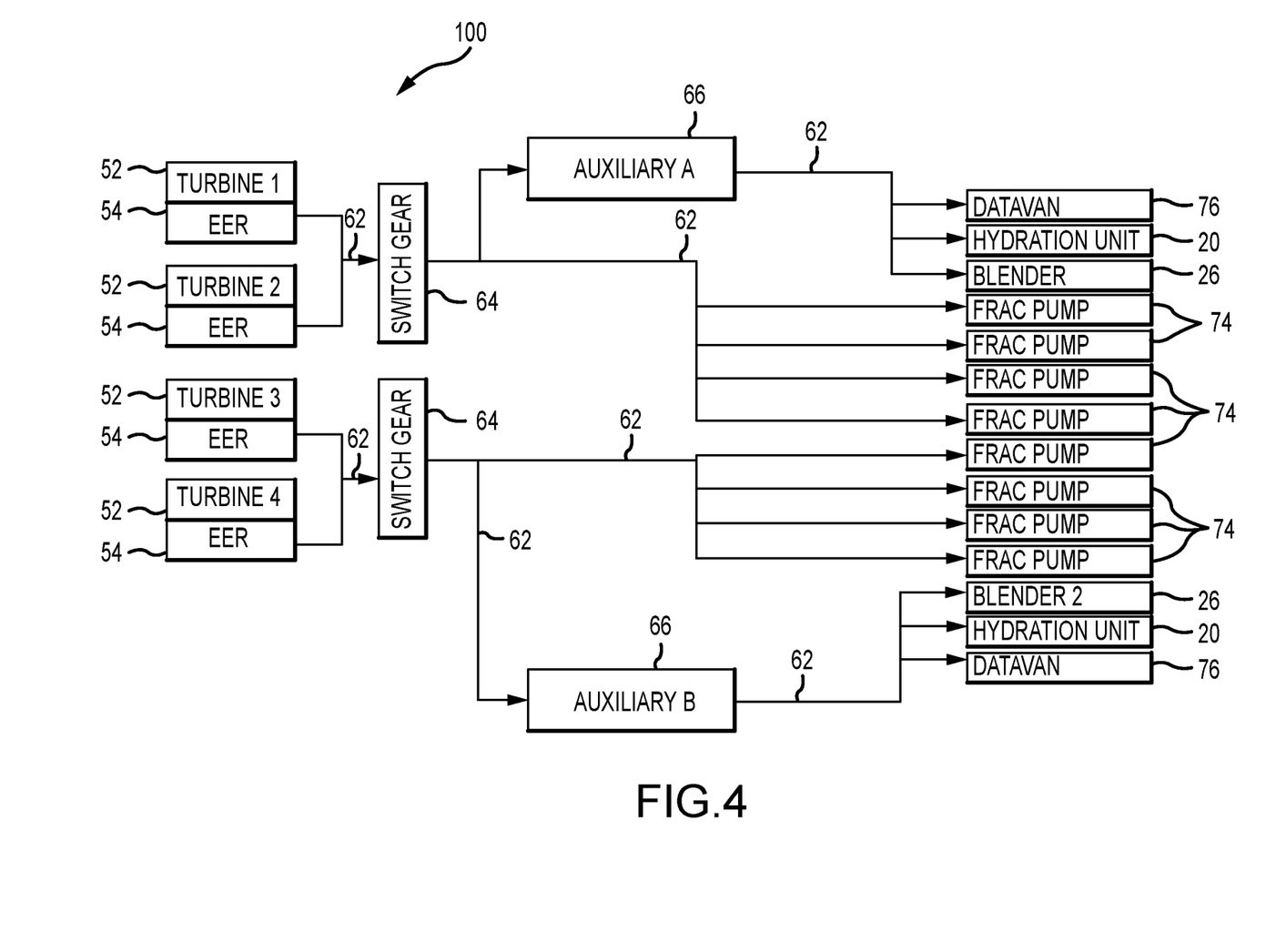
FIG. 4 is a schematic block diagram of an embodiment of a power distribution system, in accordance with embodiments of the present disclosure.

FIG. 4 is an embodiment of a power distribution system 100, in which the voltage remains constant between a location where the power is generated and a location where the power is consumed. For example, the voltage may remain constant between the generator 52 and the pump 74. It should be appreciated that, as used herein, constant refers to power systems where the voltage is not intentionally stepped up or down, for example by a transformer or other equipment, and does not apply to minor line/transmission losses and the like. The illustrated embodiment includes the turbine generators 52 and the EERs 54. It should be appreciated that while the illustrated embodiment includes 4 turbine generators 52, in other embodiments any number of turbine generators 52 may be included. As illustrated, the switch gear units 64 are electrically coupled to the turbine generators 52 via the EERs 54. The illustrated embodiment includes two switch gear units 64, but in other embodiments any number of switch gear units 64 may be used.

FIG. 4 differs from FIG. 3 in that the transformers 92 have been removed, thereby enabling direct power transmission from the switch gear units 64 to the equipment, such as the auxiliary unit 66 and the pumps 74. Advantageously, removing the transformers 92 reduces costs, complexity, and the footprint at the well site. For example, having a large number of cable connections at the well site is hazardous, time intensive during mobilization, maintenance intensive, and creates common failure points. Embodiments the present disclosure eliminate many of the cable connections to thereby improve reliability, reduce potential hazards, and decrease maintenance and mobilization times. In various embodiments, the auxiliary units 66 do not include transformers 70, as described above, and rather are configured to operate at the same voltage generated by the turbines 52. Without the transformers 70, the auxiliary units 66 may be approximately half the size of the auxiliary units 66 illustrated in FIG. 3. In various embodiments, each auxiliary unit 66 includes the VFD 68, as well as associated equipment such as soft starts and the like. It should be appreciated that auxiliary units 66 may incorporate one or more VFDs 68, and that the configuration of the auxiliary units 66 is particularly selected based on conditions at the well site.

In various embodiments, the turbines 52 produce three phase electricity at a voltage of 4,160 V. Electrical cabling 62 enables transmission from the turbines 52 to the switch gear units 64 and other associated conditions. Without the transformers 92 illustrated in FIG. 3, the pumps 74 and auxiliary units 66 are designed to operate at 4,160 V, rather than the 600 V operations described above. Accordingly, operations may commence as normal, but savings are realized for operators by eliminating the need for the transformers 92 and also reducing the footprint at the well site. In various embodiments, equipment utilized at the well site may be configured to operate at the voltage (e.g., 4,160 V in the illustrated embodiment) of the turbine generator 52 output. For example, the blender unit 26, the hydration unit 20, the proppant source 28, and data van 76 may all operate at the voltage produced by the turbine generator 52. In various embodiments, equipment such as insulated gate bipolar transistors and capacitors may be utilized to enable operation of the equipment at higher voltages. Moreover, additional equipment such as electric dust filtration vacuum systems, chemical additive systems, wireline systems, boost pumps, water transfer pumps, pad lighting, pad heating, cranes, and other electrically powered equipment may be configured to operate at the voltage supplied by the turbine generator 52. Moreover, in various embodiments, one or more smaller transformers 70 may be utilized to step down voltage for auxiliary equipment. These smaller transformers 70 have a reduced size compared to the transformers 92 illustrated in FIG. 3 because the anticipated load of the equipment coupled to them is smaller.

In various embodiments, the power supply cables 62 may be diesel locomotive cables or the like to conduct electrical energy from the generators 52 and various other components. These cables 62 may include locking connectors that may be utilized to secure the cable plugs to receptacles on the equipment. Moreover, key locks may be included in various embodiments to prevent the cables 62 from inadvertently being disconnected or swapped, reducing potential safety concerns, equipment damage, or lost operational time. In various embodiments, the switch gear units 64 include electrical hubs with breakers and power generated at the turbines 52 is directed toward the switch gear units 64 via the cables 62, and an electrical bus of the switch gear units 64 may receive and be utilized in distributing the energy to the breakers. These breakers may be associated with outlet connectors for distributing energy to equipment at the well site.

In certain embodiments, the cables 62, switches, connectors, and the like may be numbered or color coded to thereby provide visual indicators to operators regarding proper connection of the equipment. Well sites may include multiple cables running between various pieces of equipment and it is important to get each cable connected to the appropriate receptacle on the equipment in order for operations to commence properly. The use of color coded or numbered connectors enables operators to quickly and conclusively match the correct plug to the correct receptacle, even in low light or bad weather conditions. This practice further helps technicians trouble shoot faults or problems by making it easier to trace cables on the ground between equipment. Cable and receptacle labels can also utilize further markings or indicators to describe which equipment connection should correspond to which receptacle. For example, a power receptacle on a pump may be labeled "Main Power", be the color red, and also be numbered, for example. The corresponding cable may have a red connector with the number and "Main Pump Power" written on it. Additionally, the outlet at the switch gear may further be labeled the color red with a number, and "To Pump" to clearly indicate the proper connections. Accordingly, components may be efficiently and quickly coupled together utilizing the cables.

Systems and methods of the present disclosure may lead to elimination of cables and/or equipment at the well site, thereby reducing space requirements of the electric hydraulic fracturing system. Further advantages are capital cost savings of the eliminated transformers and reduced labor costs associated with installing and cabling of the transformers. Moreover, eliminating the transformers trims equipment and electric connections, thereby lowing potential failure locations in the circuit. Because energy losses are inherent when converting electricity from 13.8 kV to 600 V, removing transformers necessarily increases the efficiency of energy transfer.

Figure 5:
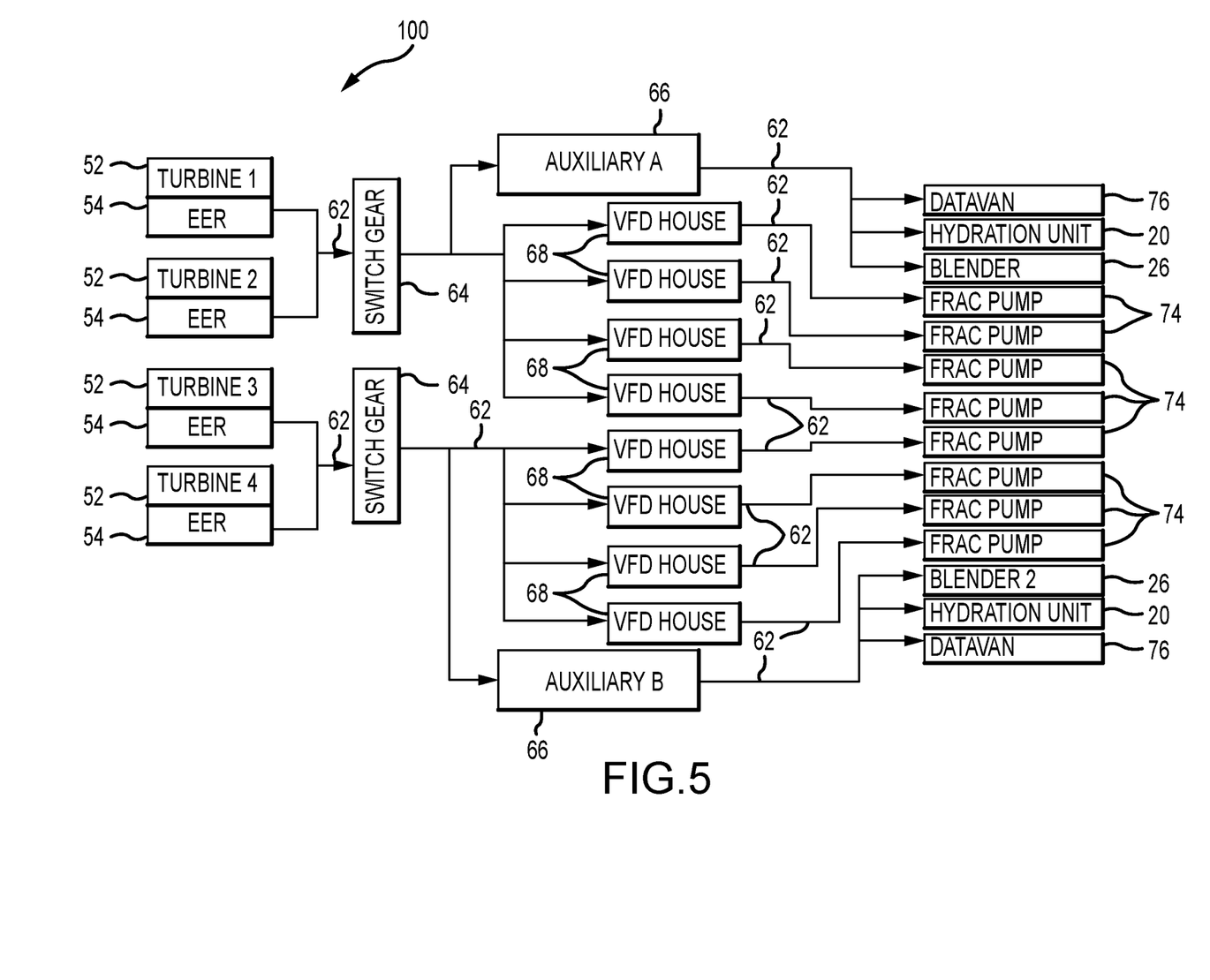
FIG. 5 is a schematic block diagram of an embodiment of a power distribution system, in accordance with embodiments of the present disclosure.

FIG. 5 is a schematic diagram of an embodiment of the power distribution system 100. In the illustrated embodiment, four turbine generators 52 produce electrical energy, for example at 4,160 V. The energy produced by the generators 52 is transmitted to the switch gear units 64, for example via the cables 62. As described above, while the illustrated embodiment may include four generators 52 and two switch gear units 64, other embodiments may have any reasonable number of generators 52 and/or switch gear units 64, as well as other equipment, based on operating conditions at the well site. The illustrated embodiment, the transformers 92 are removed as compared to FIG. 3. Accordingly, as described above, the well site may experience cost savings due to the elimination of equipment and also the simplification of connecting equipment.

In the illustrated embodiment, VFDs 68 are illustrated as separate from the pumps 74, as described above. For example, in various embodiments, the VFDs 68 may be arranged on separate skids and/or trailers. As a result, pump trailers may include multiple pumps or larger pumps due to the empty spaces on the trailers after removal of the VFDs 68. In the illustrated embodiment, the VFDs 68 are arranged within the housing 60 and are configured to operate at the same voltage generated by the generators 52. For example, in various embodiments, the voltage generated by the turbines 52 may be 4,160 V, and therefore the illustrated VFDs 68 operate at 4,160 V when the turbines 52 generate electricity at that voltage. Accordingly, intermediate equipment, such as the transformers 92 to step down the voltage to 600 V, as often used in traditional systems, are eliminated to reduce costs and increase simplicity at the well site.

It should be appreciated that while the illustrated embodiment includes eight frac pumps 74, that other embodiments may include more or fewer pumps 74. For example, in various embodiments 1, 2, 3, 4, 5, 6, 7, 9, 10, or any reasonable number of pumps may be utilized. In embodiments, an electric fleet may utilize 8-11 trailers to perform fracturing operations, or fewer for injection tests, pump downs, or other smaller operations. By eliminating or reducing various components, as described here, such as positioning the VFD 68 on its own skid/trailer, additional pumping capacity may be added or the fleet may be reduced to just 5 or 6 frac pump trailers to perform fracturing operations. Moreover, the pumps may be presented in a variety of configurations. In the embodiment illustrated in FIG. 5, by positioning the VFD 68 on its own trailer/skid, an empty slot may be available on the trailer 58 for the pumps 74. As a result, three pumps 74 may be arranged on each trailer 58. Accordingly, fewer trailers may be arranged at the well site, as described above, while the number of pumps 74 and therefore the pumping capacity is unchanged. Additionally, as described above, the pumping capacity may be increased by adjusting the configuration to include more pumps or larger pumps on the trailers. Furthermore, in embodiments, there may be a single pump 74 arranged on the trailer 58. For example, larger pumps may be utilized that take up more space on the trailers. Embodiments of the present disclosure may include pump trailers having pumps and support equipment arranged in a variety of configurations to thereby enable reduced footprints and flexibility at the well site. For example, pumps may be substantially modular such that pumps can be switched out, for example for maintenance.

Figure 6:
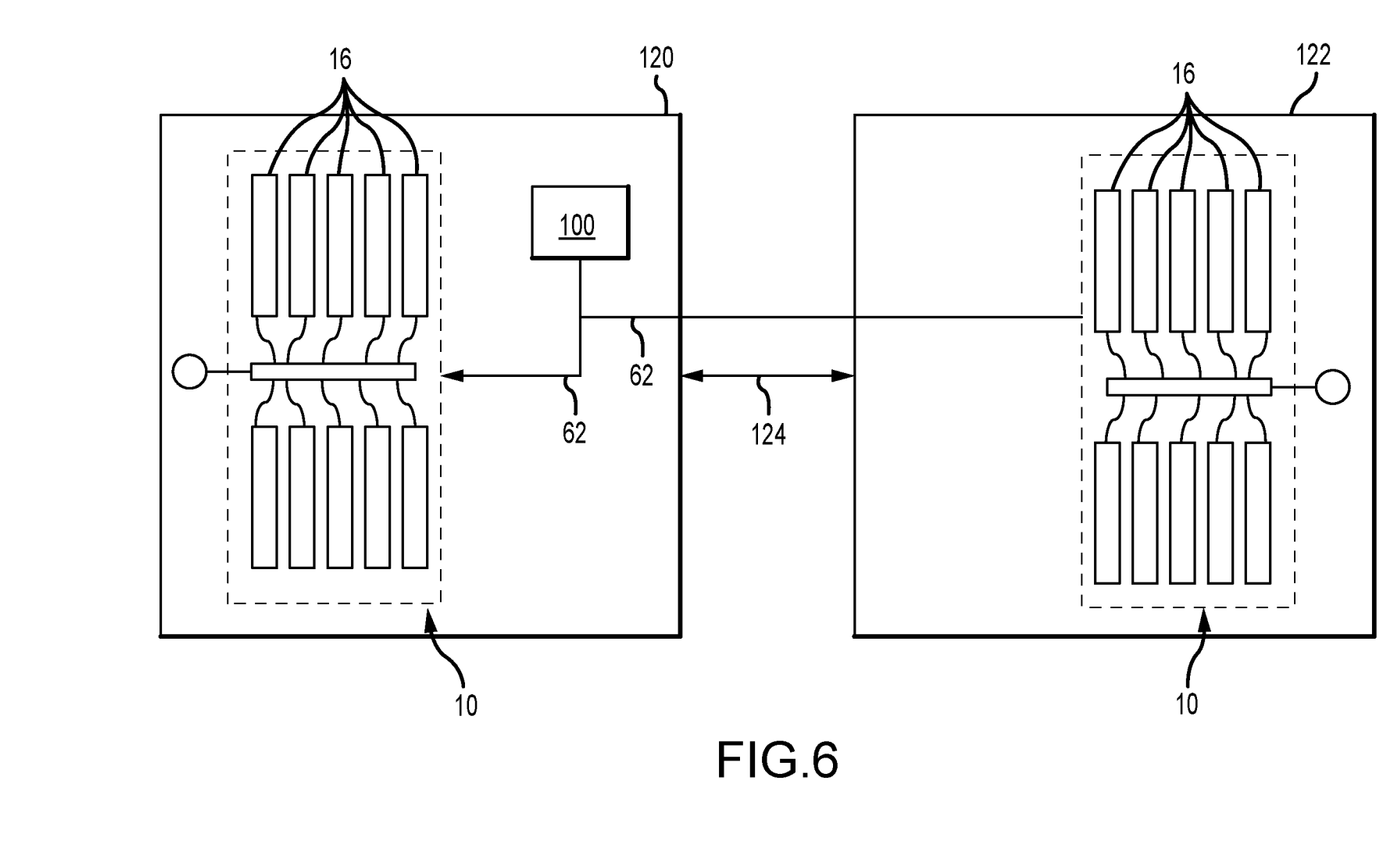
FIG. 6 is a schematic block diagram of an embodiment of a power distribution system, in accordance with embodiments of the present disclosure.

FIG. 6 is a schematic diagram of a system in which electrical energy is transmitted from a first well site 120 to a second well site 122. As shown, each well site 120, 122 includes a respective hydraulic fracturing system 10 including pump systems 16 and various support equipment, which has been removed for clarity. The illustrated first well site 120 includes the power distribution system 100, which may include one or more turbine generators 52, switch gear units 64, and the like. However, the second well site 122 does not include an individual power distribution system 100, and rather, receives electrical energy from the power distribution system 100 at the first well site 120. As described above, in various embodiments the turbine generator 52 produces electricity at approximately 4,160 V. This higher voltage can be transmitted over a farther distance 124 than the traditional systems which may run at lower voltage levels. Accordingly, the single power distribution system 100 may be used to generate electricity for more than one well site. Advantageously, costs may be reduced for the producer. For example, costs may be reduced because only a single power distribution system 100 is placed, rented, mobilized, de-mobilized, and operated. In the illustrated embodiment, the cables 62 may be utilized to connect the well sites 120, 122. However, it should be appreciated that other power distribution methods may also be used to transmit electrical energy between the well sites. Furthermore, in various embodiments, there may not be a fleet or hydraulic fracturing system 10 arranged at the first well site 120. However, there may be ongoing operations that may utilize electric power and as a result the transmission may enable the second well site 122 to receive electric power from the first well site 120, thereby eliminating total emissions at the well site 122 because a local power system may not be set up at the second well site 122. For example, in various embodiments, there may be regulations or other restrictions that may limit oil and gas exploration in a certain area, such as within residential areas, near airports, or within federal or state lands, such as parks, wildlife refuges, game lands, and the like. These restrictions may limit or block local emissions, which would make it difficult or unfeasible for certain recovery methods to operate in the area. Embodiments of the present disclosure utilize electric pumps and turbine generators for operations, which have reduced emission compared to other methods, such as diesel powered equipment. Accordingly, power generation may be established at a different location, away from the restricted area, and thereafter transmitted to the restricted area, for example via the cables 62 or by other means, to thereby limit local emissions within the restricted area to zero, near zero, or below regulatory limits. Furthermore, noise at the site may also be reduced. As such, hydraulic fracturing fleets may be utilized in environmentally sensitive areas, or areas that have other regulatory restrictions, with minimal disruption to wildlife or others in the area, while still enabling sufficient well stimulation efforts. In various embodiments, the distance between these sites can be approximately 2 miles. However, in other embodiments, the distance between the sites can be 1 mile, 3 miles, 5 miles, 10 miles, or any other reasonable distance. It should be appreciated that electric power transmission may occur at 600 V, 4,160 V, or 13.8 kV. Furthermore, in various embodiments, as described above, step down transformers may be removed from the system to thereby transmit electrical energy at a constant voltage. Moreover, transmitting the electric power from the first well site 120 to the second well site 122 saves space at the second well site 122. Furthermore, hydraulic fracturing system 10 and power distribution system 100 can be set up on well site 120. Upon the completion of stimulation operations on well site 120, fracturing system 10 can be moved to well site 122 while power distribution system 100 stays on completed well site 120. Electrical power can then be transmitted from well site 120 to well site 122 to power fracturing system 10 to resume operations on well site 122. Accordingly, embodiments of the present disclosure describe a fracturing system that enables fast mobilization between well sites because certain equipment, such as the power distribution system 100 is not moved to different sites. Moreover, subsequent well sites may have a smaller footprint because equipment may remain at the first well site.

Figure 7A:
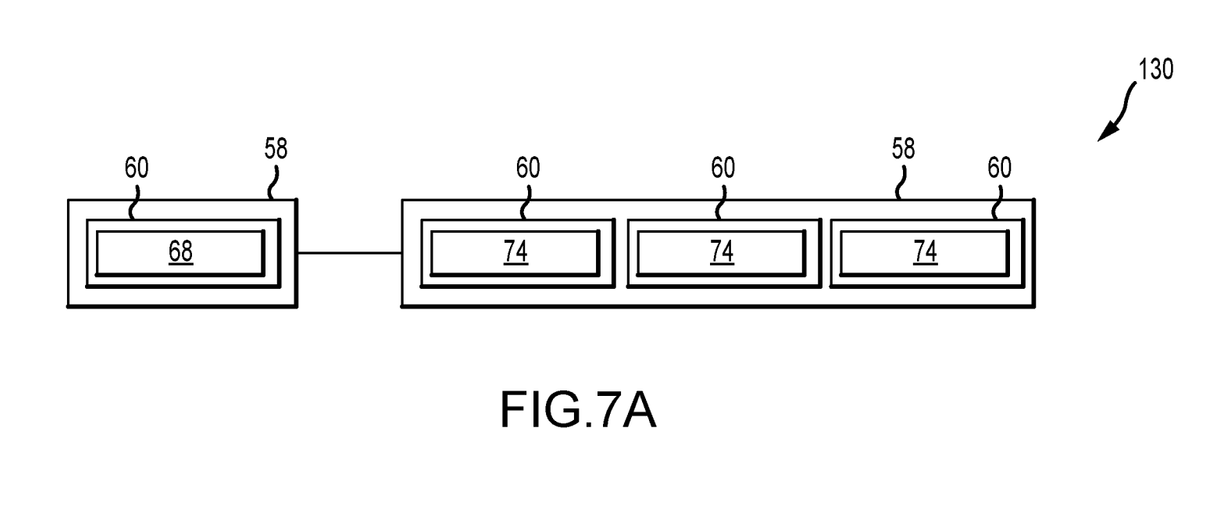
FIG. 7A is a schematic block diagram of a pumping configuration, in accordance with embodiments of the present disclosure.

FIG. 7 includes schematic diagrams of a pumping configuration 130 including a variety of configurations for the pump 74, VFD 68, and associated equipment. That is, FIG. 7A includes an embodiment of the pump trailer 58 including three pumps 74 and a second trailer 58 for the VFD 68, which as described above may be referred to as a VFD house that includes an independent VFD for each of the pumps 74 arranged on the trailer 58. As described above, by removing the VFD 68 from the trailer 58 holding the pumps 74, an empty space is formed to thereby hold an additional pump. As such, a larger number of pumps may be arranged at the well site with a reduced number of trailers 58. It should be appreciated that while the illustrated embodiment discusses using trailers 58, in other embodiments skids 56 and/or trucks may be utilized to hold and support the equipment.

Figure 7B:
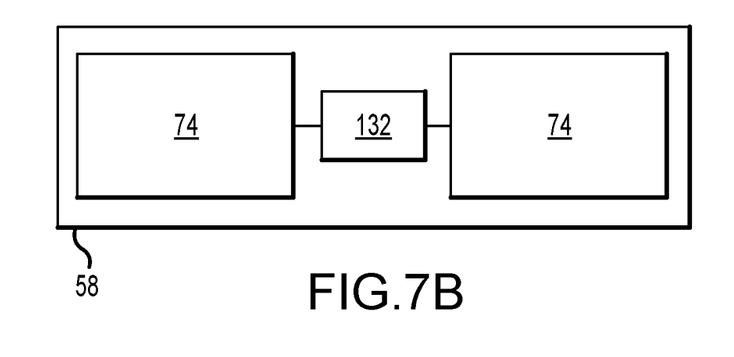
FIG. 7B is a schematic block diagram of an embodiment of a pumping configuration, in accordance with embodiments of the present disclosure.

FIG. 7B illustrates a pumping configuration in which the pair of pumps 74 are powered by a common motor 132. In the illustrated embodiment, the motor 132 is between the pumps 74. As such, less space is occupied on the pumping trailer 58 because the motor 132 is utilized to provide power to two different pumps 74.

Figure 8:
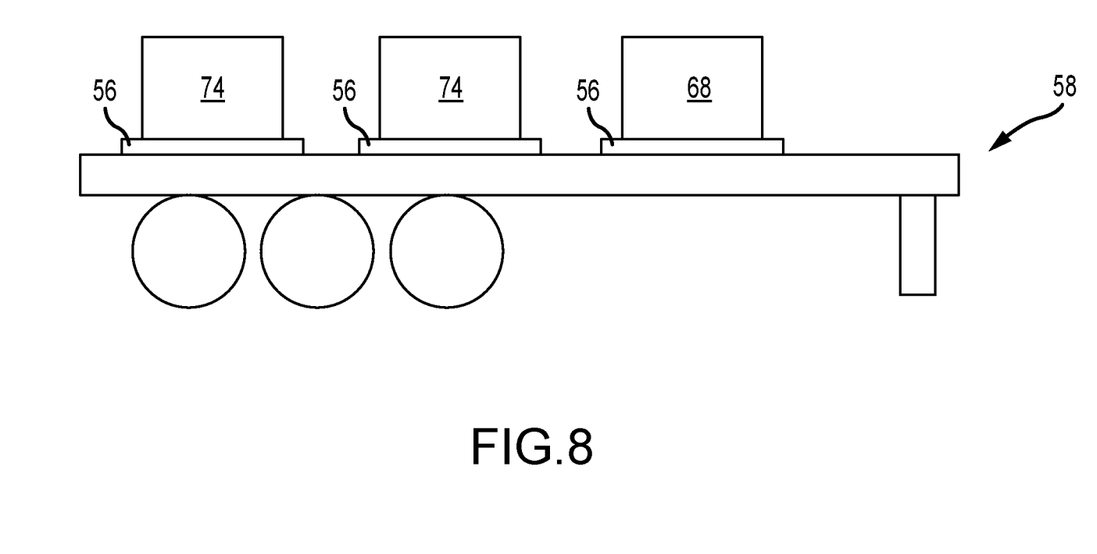
FIG. 8 is a schematic block diagram of an embodiment of a pumping trailer, in accordance with embodiments of the present disclosure.

FIG. 8 is a schematic diagram of the trailer 58 receiving skid-mounted equipment. In various embodiments, equipment utilized at the well site 12 may be mounted on the skid 56 to enable quick and easy mobilization, de-mobilization, and configuration at the well site. For example, equipment may be transported to the well site 12 on the trailer 58, which receives the skid-mounted equipment. Thereafter, at the well site 12, the equipment may be off-loaded from the trailer 58 and arranged at appropriate locations at the well site 12. However, in other embodiments, the skid-mounted equipment may remain on and be utilized while stationed on the trailer 58. In various embodiments, the skid-mounted equipment may be substantially modular, such that equipment may be swapped out with other skid-mounted equipment for maintenance and repairs. In the illustrated embodiment, the trailer 58 includes pumps 74 and the VFD 68, all mounted on respective skids 56. In operation, the equipment may be used while on the trailer 58 or removed from the trailer 58 and staged at the well site 12. In this manner, the well site 12 has increased flexibility, which is advantageous at well sites 12 with small staging areas or well sites 12 that are crowded with other equipment.

Various embodiments described here discuss the pumps 74. It should be appreciated that pumps 74 may refer to the pumps 74 and/or pump systems that include one or more pumps on the trailer 58, skid 56, or a truck. In various embodiments, the pump systems may include a motor (e.g., electric motor, AC induction motors, permanent magnetic motors, DC motors, etc.), a power end including gear systems to convert rotational movement into lateral movement, and a fluid end which may include valves or a manifold to direct the fluid from the pump. Moreover, the pumps 74 may be any type of suitable pump, such as reciprocating, centrifugal, positive displacement, rotary (e.g., gear pumps, screw pumps, rotary vane pumps), progressing cavity, roots-type, peristaltic, plunger, hydraulic ram, velocity, or any other reasonable type of pumps.

It should be appreciated that while various embodiments described herein discuss voltages such as 4,160 V or 13.8 kV that other voltages may be utilized. For example, other options may include 600 V, 480 V, 240 V, or any other voltage that may be utilized commercially. Frequency can be approximately 50 Hz or 60 Hz. Moreover, in embodiments, the turbine generators 52 may each produce approximately 5.7 MW of electricity. However, other turbine generators 52 producing less electricity or more electricity may be utilized. Additionally, it should be appreciated that the power can be broken up into one or more banks. Moreover, in embodiments, the generators 52 and/or the equipment may be particularly selected based on the power output or generate of the other. For example, in embodiments the generators 52 may produce power at 4,160 V and the associated equipment may also operate at 4,160 V. In other embodiments, the generators 52 may produce power at 600 V and the associated equipment may also operate at 600 V. Accordingly, different configurations may be utilized in order to utilize equipment that operates at the same voltage as power generation equipment.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A hydraulic fracturing system, comprising:
 a plurality of turbine generators for producing electricity at a well site, the plurality of turbine generators producing electrical energy at a voltage; and
 a plurality of electric pumps, positioned on a support structure, electrically coupled to the plurality of turbine generators, each electric pump of the plurality of electric pumps being configured to operate at the voltage, wherein the voltage is distributed to the plurality of electric pumps without being conditioned by a transformer.

2. The hydraulic fracturing system of claim 1, further comprising:
 switch gear arranged between the plurality of electric pumps and the plurality of turbine generators, the switch gear distributing electrical energy from the plurality of turbine generators to the plurality of electric pumps.

3. The hydraulic fracturing system of claim 2, wherein the switch gear and the plurality of electric pumps comprise indicators, the indicators identifying respective outlet and inlet connectors of the switch gear and plurality of electric pumps that are coupled together via respective power cables.

4. The hydraulic fracturing system of claim 1, further comprising:
 a step down transformer configured to receive electric energy from the plurality of turbine generators; and
 auxiliary equipment, the auxiliary equipment utilizing an operating voltage that is less than the voltage, the step down transformer configured to reduce the voltage to the operating voltage.

5. The hydraulic system of claim 1, wherein the turbine generator is powered by natural gas.

6. The hydraulic fracturing system of claim 1, wherein the plurality of electric pumps are part of a pump trailer, the pump trailer comprising the plurality of electric pumps, a motor, and a variable frequency drive connected to the motor to control the speed of the motor.

7. The hydraulic fracturing system of claim 1, further comprising:

a variable frequency drive connected to a motor, the motor configured to couple to at least one pump of the plurality of electric pumps.

8. The hydraulic fracturing system of claim 7, wherein the variable frequency drive is mounted on a second support structure.

9. The hydraulic fracturing system of claim 1, wherein the plurality of electric pumps are arranged on respective skids.

10. The hydraulic fracturing system of claim 1, wherein the turbine generator produces electricity at 4,160 V and the electric pump operates at 4,160 V.

11. A hydraulic fracturing system, comprising:
a plurality of turbine generators for producing electricity at a well site, the plurality of turbine generators producing electrical energy at a voltage;
a plurality of electric pumps, positioned on a support structure, electrically coupled to the plurality of turbine generators, each electric pump of the plurality of electric pumps being configured to operate at the voltage after distribution via one or more cables wherein the voltage is not intentionally stepped up or down between the plurality of turbine generators and the plurality of electrics pumps; and
a variable frequency drive (VFD), positioned on a second support structure, connected to at least one motor to control a speed of the at least one motor, the at least one motor driving an electric pump of the plurality of electric pumps, wherein the VFD also operates at the voltage.

12. The hydraulic fracturing system of claim 11, further comprising:
switch gear arranged between the plurality of electric pumps and the plurality of turbine generators, the switch gear distributing electrical energy from the plurality of turbine generators to the plurality of electric pumps.

13. The hydraulic fracturing system of claim 12, wherein the switch gear and the plurality of electric pumps comprise indicators, the indicators identifying respective outlet and inlet connectors of the switch gear and plurality of electric pumps that are coupled together via respective power cables.

14. The hydraulic fracturing system of claim 11, further comprising:
a step down transformer configured to receive electric energy from the plurality of turbine generators; and
auxiliary equipment, the auxiliary equipment utilizing an operating voltage that is less than the voltage, the step down transformer configured to reduce the voltage to the operating voltage.

15. The hydraulic system of claim 11, wherein the turbine generator is powered by natural gas.

16. The hydraulic fracturing system of claim 11, wherein the plurality of electric pumps are arranged on respective skids.

17. The hydraulic fracturing system of claim 11, wherein the turbine generator produces electricity at 4,160 V and the electric pump operates at 4,160 V.

18. The hydraulic fracturing system of claim 11, wherein the VFD is positioned within an enclosure.

19. The hydraulic fracturing system of claim 11, further comprising:
an auxiliary unit, positioned on a second support structure, electrically coupled to the plurality of turbine generators, wherein the auxiliary unit receives and distributes electrical energy at the voltage without intentionally stepping up or stepping down the voltage received from the plurality of turbine generators; and
a plurality of support equipment coupled to the auxiliary unit and configured to operate at the voltage.

20. The hydraulic fracturing system of claim 11, further comprising:
a blender unit receiving a fluid and proppant, the blender unit combining the fluid and proppant to form a slurry, wherein the blender unit is operable at the voltage; and
a hydration unit distributing the fluid to the blender unit, wherein the hydration unit is operable at the voltage.

* * * * *